INVENTOR.
Ernest U. Lang

United States Patent Office 3,231,801
Patented Jan. 25, 1966

3,231,801
PLURAL MOTOR MASTER-SLAVE CONTROL SYSTEM EMPLOYING PULSE RESPONSIVE ELECTRONIC TRANSMISSION
Ernest U. Lang, Niles, Mich., assignor to National-Standard Company, Niles, Mich., a corporation of Delaware
Continuation of application Ser. No. 13,936, Mar. 9, 1960. This application Sept. 2, 1964, Ser. No. 395,357
12 Claims. (Cl. 318—8)

The invention is directed to a system for providing predetermined rotational coordination between two members and more particularly to an electro-mechanical transmission which provides a very fine incremental adjustment of the positive, predetermined displacement ratio between such members.

Further, this application constitutes a continuation of my previously filed application, Serial No. 13,936, filed March 9, 1960, now abandoned.

There are many industrial techniques which require the rotation or positioning of a driven member with a high degree of accuracy in relation to, or as a function of, the rotation of a reference member. For example, in the machine tool industry it is known to simultaneously produce a number of facsimiles of a prototype part on a corresponding number of separate cutting machines, from information provided by a master machine which senses the physical dimensions of the prototype and transmits command signals, related to the sensed information, to each cutting machine. If the sensing element is driven through a certain distance to engage the prototype, the rotation of the driving element can be translated to the slave machines and a corresponding rotation effected in driving a cutting tool through the work down to the desired depth. Exact conformance between the shape of the finished reproductions and that of the prototype depends upon highly accurate transmission of rotational information from the sensing, or reference, member to the cutting or driven member.

In other mechanisms it is desired to accurately rotate a driven member in relation to the rotation of a reference or guiding member. For example, in the fabrication of an inductance coil, a relay winding and similar structures, a length of conductive wire is wound upon a suitable base or driven member, and the driven member and reference member may be used to provide structures which consistently have a predetermined accurately measured number of turns.

In other applications such as in the winding of a control grid for regulating the electron flow from the cathode of an electron tube, by maintaining other factors constant and forming a predetermined number of turns upon such driven member, the reference and driven members can be used to provide a control grid structure which has electrical characteristics of an extremely reliable and uniformly accurate nature. As is well known in the art, the provision of regular control characteristics of the electron stream in most tubes depends upon a precise and even spacing between the individual turns of the grid. In other tubes, for example, in the production of a remote cut-off or variable mu tube, it is necessary to introduce a non-linearity into the spacing of the grid wires. Specifically, it is required to maintain the inter-turn spacing small at either end of the grid structure, with a larger inter-turn spacing in the central region of the control grid. For even spacing, the conductive grid wire can be fed over an "endless screw" type reference member to a driven member, which is rotated in a predetermined drive ratio relative to the reference member. To introduce a desired non-linearity into the inter-turn spacing to provide a variable mu grid, it is possible to decrease and increase such drive ratio in a regular pattern. That is, as the drive ratio is decreased between the driven and reference members (i.e. decreasing the angle of rotation of the driven member for a given increment of rotation of the reference member), the spacing between successive turns on the driven member is increased. Conversely, as the drive ratio is increased, spacing between turns is decreased. It is apparent that as the turns of the grid winding are spaced with greater precision the electrical control characteristics of the finished electron tube are more uniform and reliable.

In certain other types of electron-discharge devices it is known to focus an electron beam, to provide a small electron landing area of good definition, by directing the beam along the axis of a helical focussing element. Application of a potential difference to opposite ends of the helical element establishes a focussing field along such element. To obtain a uniform field, it is requisite that the inter-turn spacing of the helical element be evenly maintained. In those structures where it is desired to reduce the beam diameter adjacent the target area by increasing the strength of the focussing field thereat, the inter-turn spacing must be precisely varied to secure a corresponding variation in the focussing field.

In these and other similar types of apparatus, there has been a definite need for a device which is capable of providing rotation of a driven or base member in a predetermined relation to the rotation of a reference member. The known prior art systems have not proven particularly satisfactory. One example of the known shortcomings is evidenced by the so-called transmission systems which use mechanical components to fix the drive ratio between the driven and the reference member. Because of inherent slippage as augmented by other deleterious effects such as backlash, etc., an exact reproduction of a predetermined rotation is virtually unobtainable therewith. Other arrangements, including known combination electro-mechanical systems, are similarly deficient.

It is therefore a principal object of the present invention to provide a system for effecting a predetermined rotational coordination between a driven member and a reference member with a high degree of precision.

It is another object of the present invention to provide such a transmission system which utilizes electrical components to enhance the over-all accuracy of the rotational information transmitted.

Yet another object of the invention is to provide such a transmission system in which the increment of the rotational movement of the driven member for a given increment of rotation of the reference member can be readily altered, and further which may be altered while the system is in operation.

A more specific object of the invention is to provide such a transmission system which includes a very fine incremental adjustment of the positive, predetermined displacement ratio between the reference and driven members.

An electro-mechanical transmission constructed in accordance with the inventive teaching to effect a preselected rotation of a driven member in response to the rotation of a reference member comprises a command unit including means for counting a number of received signal pulses and for passing only a single command pulse responsive to receipt of a preassigned number of signal pulses. Means for producing electrical signal pulses as a function of the rotation of the reference member are coupled between the reference member and the command unit. Stepping means for effecting a preassigned increment of rotation of the driven member responsive to receipt of a single command pulse are coupled between the command unit and the driven member.

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

Figure 1:
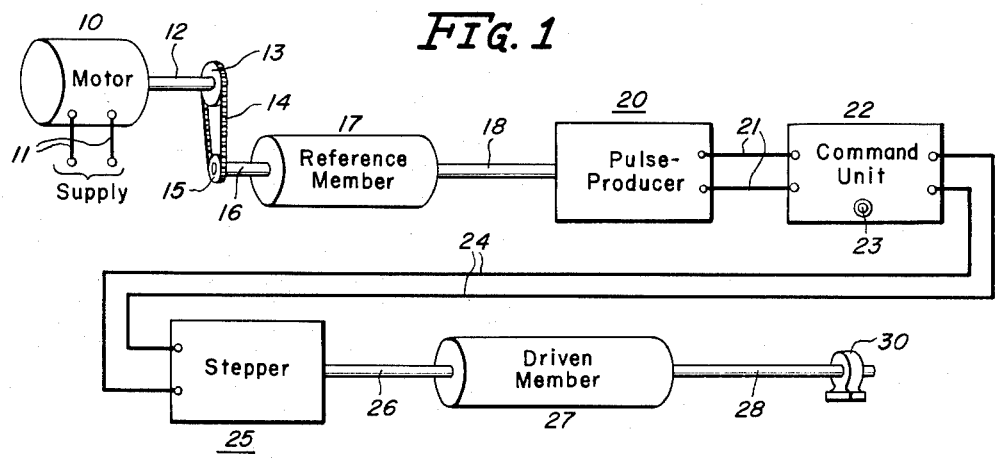
FIGURE 1 is a block diagram illustrating the invention.

In FIGURE 1 reference numeral 10 indicates a conventional electric motor which, when energized over its input conductors 11 from a source of electrical power (not shown), produces a mechanical output signal in the form of a rotation of shaft 12. A driving pulley 13 is affixed to shaft 12 and coupled over a flexible drive belt 14 to a driven pulley 15, similarly fastened to a shaft 16. Shaft 16 is affixed to a reference member 17 so that rotation of shaft 16 effects a corresponding rotation of reference member 17. Reference member 17 may be any of a plurality of elements, such as an endless screw feed for indexing the conductive wire to be wound on the driven member. As will be made clear hereinafter, variation of the drive ratio between such reference member and driven member 27 can be utilized to vary the spacing of adjacent turns when the conductive wire is wound around driven member 27 to form inductors, potentiometers, relay windings, grids, meshes, and related devices.

A shaft 18 is affixed between reference member 17 and a pulse-producer 20, to translate a mechanical rotational signal between those elements. Pulse producer 20 can be any of a number of means, e.g., a magnetic tachometer transducer, which provides electrical signal pulses at its output terminals in response to the application of an input rotational or angular displacement signal. In one embodiment, for example, a magnetic tachometer transducer was adjusted to produce 120 electrical signal pulses for each complete revolution of its input shaft to thereby index or reference each revolution of the reference member by a relatively large number of signal pulses. The use of electrical signal pulses to reference mechanical rotation is analogous to translating a mechanical event into signals in the time and/or frequency domain, and the provision of a multiplicity of such pulses for each revolution of reference member 17 permits the provision of extremely fine increments of control over the drive ratio between reference and driven members.

The output terminals of the pulse-producer are coupled over conductors 21 to the input terminals of a command unit 22, which may be a preset counter of the type utilizing a plurality of electrical decade counters. In accordance with one aspect of the inventive teaching, command unit 22 includes control means, depicted as a knob 23, which presets the number of signal pulses which must be received over conductors 21 to enable only a single command pulse to issue from the output terminals. This control over the number of signal pulses which must be received before a single command pulse issues, in cooperation with the provision of a multiplicity of signal pulses for each revolution of reference member 17, enables the invention to regulate in minute increments the positive, predetermined displacement ratio between reference and driven members. Displacement or drive ratio, as used herein, refers to the actual angular displacement of driven member 27 for a given angular displacement of reference member 17.

The output terminals of command unit 22 are coupled over conductors 24 to the input terminals of a stepper 25. The stepper may include a motor having a plurality of windings, in which the various windings are successively energized by sequence command pulses to effect an increment of rotation of a mechanical shaft responsive to the receipt of the electrical command signas. In conjunction with the stepping means, separate circuitry for switching the command pulses from one to another of the motor windings may be employed if desired, as will be explained more fully hereinafter. Stepper 25, in effect, receives intelligence in the time domain and translates this intelligence into a mechanical function.

Stepper 25 is coupled over a shaft 26 to one end of a driven member 27, which has another shaft 28 coupled to its opposite end and journalled in a fixed bearing 30. It is desired to effect a particular rotation of driven member 27 as a function of the rotation of reference member 17, the positive displacement ratio between such members being adjustable in extremely fine increments.

When motor 10 is energized, its output shaft 12 is driven and translates power over flexible belt 14 to drive shaft 16, thus effecting rotation of reference member 17. The angular displacement of reference member 17 also causes rotation of shaft 18, producing a mechanical signal at the input side of pulse-producer 20, which translates the mechanical movements of reference member 17 into the time domain by producing a representative series of electrical signal pulses, whereby the number of pulses produced is a function of the rotation of reference member 17. For purposes of explanation, it is assumed that as reference member 17 is rotated through 360°, 120 electrical signal pulses (or 1 pulse for each 3° of rotation) are generated and coupled over conductors 21. Thus, rotation of reference member 17 through two complete revolutions would produce 240 electrical signal pulses, and a half revolution of reference member 17 would produce only 60 electrical signal pulses.

Such pulses are translated over conductors 21 and applied to the input terminals of command unit 22, whence they are channelled to the appropriate counting circuits (not shown) therein. Such counting circuits total the number of signal pulses received in a manner well known in the art. Manifestly a count of electrical signal pulses, or the integration of a series of events in the time domain, is accomplished with a very high degree of accuracy, as contrasted to a mechanical determination of instantaneous angular displacement of the rotating reference member. When this count reaches the total preset by control means 23, a single command pulse issues from the output terminals of command unit 22 and is translated over conductors 24 to the input terminals of stepper 25.

In stepper 25 each electrical command pulse is converted into a predetermined increment of rotation or angular displacement of shaft 26 and driven member 27. Accordingly, the original rotation of reference member 17 is reflected in the subsequent, related step displacement of driven member 27.

The particular count setting on control means 23 governs the positive, predetermined displacement ratio between driven member 27 and reference member 17. If pulse-producer 20 transmit 120 signal pulses for each revolution of reference member 17, and the count on command unit 22 is set at 120, then a single command pulse is issued and driven member 27 is stepped through a unit angular displacement for each revolution of reference member 17. If the count is lowered to 60, then a unit angular displacement of the driven member is effected for each 180° of rotation of the reference member; if the count is raised to 240, then such unit displacement is realized for each 720° of rotation of the reference member. Accordingly the positive displacement ratio or drive ratio between reference and driven members is varied in small increments as the preset count is varied. Stated in another way, driven member 27 is always displaced as a function of the rotation of reference member 17, and the value of this function can be varied in minute amounts by effecting a correspondingly small change in the preset count on command unit 22.

To permit adjustment of the positive displacement ratio between driven member 27 and reference member 17 in even finer increments than is possible with the embodiment shown in FIGURE 1, in accordance with another aspect of the invention, it is possible to increase the drive ratio between reference member 17 and pulse-producer 20, either by electrical or by mechanical means, and thus to apply many more signal pulses to command unit 22 for a given rotation of reference member 17. The mechanical or electrical means of increasing such drive ratio will now be described.

Figure 2:
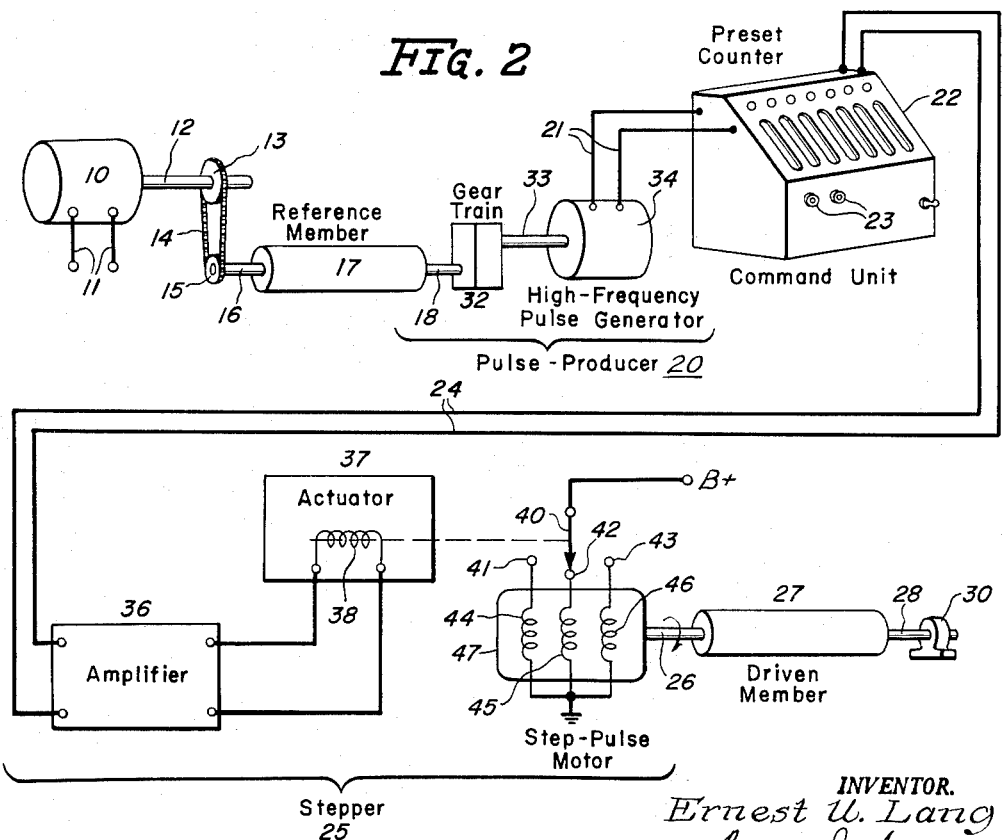
FIGURE 2 is another block diagram, illustrating other components useful in practicing the invention.

The system of FIGURE 2 differs from that of FIGURE 1 by a more specific portrayal of pulse-producer 20 and stepper 25. Pulse-producer 20 as there shown includes a drive ratio modifying means, such as a gear train represented by block 32, coupled over shaft 18 to reference member 17. The output side of the drive ratio modifying means, or gear train 32, is coupled over a shaft 33 to a high-frequency pulse generator 34. The gear train arrangement may be conventional and preferably is of the type which increases the drive ratio between shaft 18 and shaft 33; that is, for a single revolution of shaft 18, shaft 33 is driven through more than a single revolution. High-frequency pulse generator 34 can be any conventional machine, such as a magnetic tachometer transducer, for producing a number of electrical signal pulses at its output terminals responsive to the application of a given input angular displacement or rotational signal.

The output terminals of high-frequency pulse generator 34 are coupled to the input terminals of command unit 22. It will be understood that wherever input or output terminals are described in the plural, in fact only a single connector may be utilized. For example, some equipment is interconnected over a coaxial cable having concentric conductors, in which case only a single connector and receptacle is utilized rather than a two-wire system where two distinct input and output connections are made.

The output terminals of command unit 22 are connected to the input terminals of stepper 25, which in the illustrated embodiment includes both an amplifier 36 and a switch actuator 37. Actuator 37 may include a relay winding 38, arranged to displace a movable switch contact 40 successively into engagement with each of fixed contacts 41, 42 and 43. A source of uni-directional operation potential, conventionally designated B+, is connected to movable contact 40; fixed contacts 41–43 are connected to motor windings 44–46, which is also a component of stepper 25. In the position indicated, motor winding 45 is energized over a path extending from ground over winding 45, fixed contact 42, and movable contact 40, to B+.

It is evident that a high degree of accuracy between the position of driven member 27 and that of reference member 17 can be obtained, because the actual displacement of reference member 17 is artificially increased in gear train 32, thus producing a very high number of reference signal pulses for each rotation of reference member 17. Manifestly the slightest movement of reference member 17 may now be represented by a number of signal pulses, and the counting device may be set to translate each such movement into a related movement of driven member 27.

Moreover, it is further evident that the increment of rotation of driven member 27 for a given angular displacement of reference member 17 can be altered even while the system is in operation, by changing the count on command unit 22 and thus changing the number of input pulses necessary to step member 27 through a single increment of angular displacement to thereby provide an electronic gear-shift.

For exemplary purposes it is assumed that gear train 32 is constructed with a drive ratio of 120:1, and that high frequency pulse generator 34 produces 120 signal pulses for each revolution of shaft 33; then 14,400 electrical signal pulses are applied to the input terminals of command unit 22 for each revolution of reference member 17. Manifestly if 14,400 signal pulses denote rotation of reference member 17 through 360°, then 40 pulses represent rotation through only one degree. If the preset count is increased by only one digit, reference member 17 must rotate through an additional 0.025 degree before the increment of rotation of driven member 27 occurs. The converse is true when the count is decreased by a single digit; the unit angular displacement or rotational step of the driven member then occurs 0.025 degree earlier in the rotation of the reference member. It is therefore manifest that an extremely fine incremental control over the positive displacement ratio between driven and reference members is afforded by the invention.

It is also possible in other applications to utilize the advantages afforded by the invention without command unit 22. Thus, assuming that driven member 27 is to be rotated in synchronism with the angular displacement of reference member 17, and that 36 command pulses must be applied to stepper 25 to rotate driven member 27 through 360°, pulse-producer 20 is arranged to issue 36 electrical pulses as reference member 17 is rotated through 360°, and such pulses are applied directly to stepper 25 to obtain the desired synchronous rotation. The positive drive ratio cannot, of course, be varied in such a system; nevertheless the advantages of minimum slippage, preclusion of backlash, etc., are provided in such a constant-drive-ratio system.

Returning to the embodiment of FIGURE 2, at the moment the input pulses applied to command unit 22 reach the preset total, a single command pulse is translated from the output terminals thereof over conductors 24 to the input terminals of amplifier 36. The command pulse is amplified in amplifier 36 and translated to winding 38 within actuator 37. In a well-known manner, this actuator displaces movable contact 40 from fixed contact 42 to engage fixed contact 43, thereby de-energizing winding 45 and completing an obvious energizing circuit for field winding 46. Accordingly the rotor of motor 47 is displaced to line up with the newly created magnetic field surrounding winding 46. This variation of the rotor position, from an orientation related to one winding, to a definite, locked-in alignment with the magnetic field of a successive winding, causes the progression of shaft 26 through a definite step or increment of rotation as a result of a single command pulse being translated from command unit 22. Manifestly, the rotation of driven member 27 can be accurately controlled in relation to the angular movement of reference member 17.

It has been explained that the showing of FIGURE 2 is illustrative only, and not a literal representation of the complete circuitry. It has been determined in practice that a suitable amplifier and switch means, plus a step-motor, for use in stepper 25 of the invention, is the Digitork Control Model C101 and the Digitork Motor Model M200, manufactured by the Automatic Controls Division of The Teller Company, Butler, Pennsylvania. Because the specified motor has a plurality of phases which are energized in sequence as indicated in FIGURE 2, the motor rotates in small steps and is magnetically locked in position after the next successive field winding is energized. Accordingly, free-wheeling and overshoot of the motor is obviated, while simultaneously a highly accurate indexing mechanism, as well as power translation means, is provided.

As to the several other elements of the inventive combination depicted generally in FIGURE 2, gear train 32 may of course be any suitable arrangement having a drive ratio suited to the particular environment of the invention. A magnetic tachometer transducer suitable for use as high-frequency pulse generator 34 is the Model 461 produced by the Berkeley Division of Beckman Instruments, Inc., Richmond, California. A suitable command unit or preset counter is the Model DS–8606 Preset Counter, produced by the Computer-Measurements Division of The Detectron Corporation, North Hollywood, California.

Reference member 17 and driven member 27 may vary, depending upon the particular use to which the invention is to be put.

It is evident that pulse-producer 20 is properly characterized as means for translating rotation or angular displacement, a mechanical event, into signal pulses in the time domain, at a repetition rate which is a function of such rotation. In like manner, stepper 25 is the converse; that is, stepper 25 is a means for receiving a command pulse signal and translating this signal into an increment of rotation or a step displacement, or for converting intelligence in the time or frequency domain into physical phenomena. Other methods of producing a number of high-frequency pulses in response to rotation will suggest themselves to those skilled in the art.

For example, the mechanical means for increasing the drive ratio between the output of the reference member and the input of the pulse-generator could readily be replaced by an electrical means. That is, the gear train could be removed, and the output terminals of pulse-generator 34 coupled to a frequency-multiplier stage.

Such a stage could be a conventional oscillator arrangement, having a circuit which is adjustable to resonate at a frequency which is an even multiple of the repetition frequency of the pulses applied thereto. The frequency-multiplier stage could in turn be coupled through a clipper stage to a differentiator stage, in its turn coupled to the input terminals of command unit 22.

With such an electrical system, the rotation of the reference member is translated into electrical signal pulses in the high-frequency pulse generator, and applied to the frequency-multplier stage. The frequency-multiplied pulses are coupled through the clipper stage and the differentiator stage to the input terminals of the command unit, wherein they are totalled to provide the operation already described. Thus an electrical means for increasing the angular displacement of reference member 17, as viewed from command unit 22, is readily substituted for the gear train of FIGURE 2.

Figure 3:
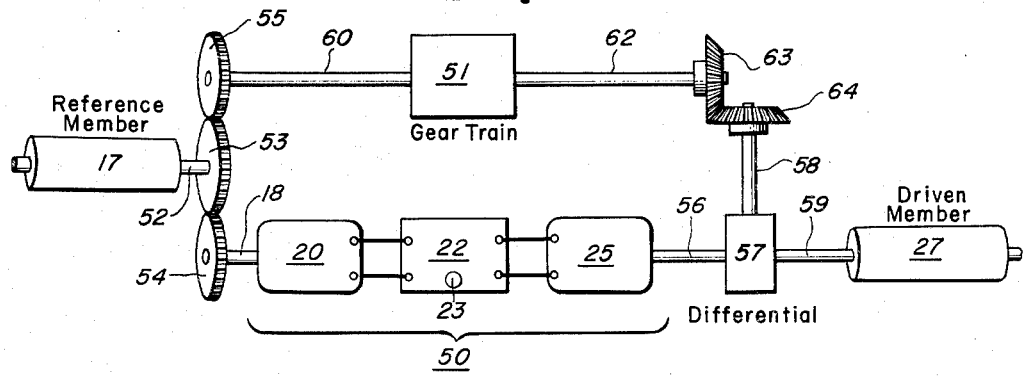
FIGURES 3 and 4 are block diagrams illustrating other embodiments of the invention.

FIGURE 3 shows an electro-mechanical transmission 50, such as that shown and described in connection with FIGURES 1 and 2, parallel-coupled with a mechanical transmission or gear train 51 between reference member 17 and driven member 27. Such an arrangement is useful, for example, where it is desired to position the driven member with an accuracy measured in eight significant figures, and especially where a large number of operations are performed in quick succession, each operation requiring an ultimate position of driven member 27 in which the first six significant figures are always the same and the only variation is in the seventh and eighth significant figures. Manifestly gear train 51 can be constructed with high precision to insure positioning of driven member 27 within the accuracy of six significant figures, and the last two significant figures can then be determined by adjustment of control knob 23 to vary the preset count in command unit 22.

Specifically, reference member 17 is connected to a shaft 52 on which is fastened a gear 53, positioned to mesh with and drive each of adjacent gears 54 and 55. Gear 54 is affixed to one end of shaft 18, which is also coupled to pulse-producer 20. The structure and operation of each of the components in electro-mechanical transmission 50 have been fully set forth above. The output unit, stepper 25, is coupled to one input shaft 56 of a differential unit 57. Differential unit 57 also has another input shaft 58, and a signle output shaft 59, which is coupled to driven member 27. As used herein, differential unit refers to a means for translating over an output shaft a single rotational signal related to input signals received over either of two or more input shafts.

Gear 55 is affixed to one end of a drive shaft 60, in turn coupled to the input side of gear train 51. The output side of gear train 51 is coupled over a shaft 62 to a gear 63, which meshes with a corresponding gear 64 affixed to one end of input shaft 58 of differential unit 57.

In operation the counting circuits within command unit 22 are preset by adjustment of control knob 23 to determine the seventh and eighth significant figures for regulating the ultimate rotational position of driven member 27, and reference member 17 is then displaced through a given angular displacement. Gear train 51 insures the positioning of driven member 27 within the accuracy of the first six places, and the setting within command unit 22 determines the last two of the eight significant figures. Prior to the next operation, the setting within command unit 22 can be altered slightly to realize an ultimate position of driven member 27 differing only in the seventh and eight significant figures.

Figure 4:
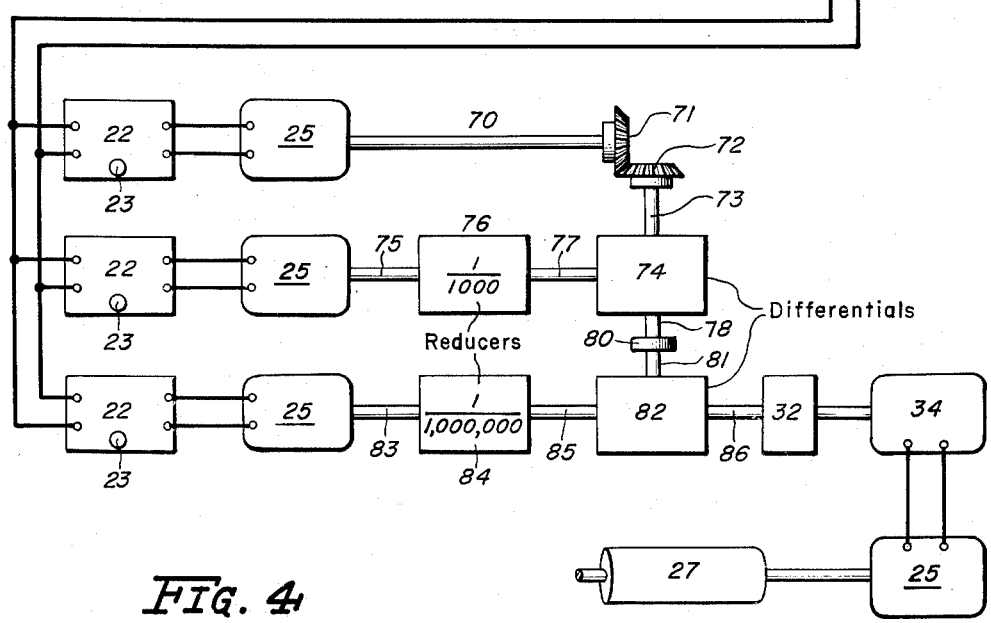

The embodiment of FIGURE 4 is related to that of FIGURE 3 in that the system depicted at FIGURE 4 is useful to attain an accuracy of the position of driven member 27 within eight significant figures, and has the additional advantage of facilitating very quick reset of the system to permit the next successive operation to commence. Specifically, the system there shown includes three control channels, the first of which does not include a gear box and can be utilized to determine the final position of driven member 27 within the accuracy of the first three significant figures. The second control channel includes a drive ratio modifying means or gear box having a 1:1,000 reduction ratio, and can be used to regulate the ultimate position of member 27 as respects the next three significant figures; the third control channel includes a different gear box having a reduction ratio of 1:1,000,000 and is utilized to obtain a precise rotational adjustment in the last two significant figures.

Specifically, in FIGURE 4 reference member 17 is coupled through a gear train 32 to high-frequency pulse generator 34, as described and explained in connection with FIGURE 2. The output terminals of high-frequency pulse generator 34 are coupled to the input terminals of three separate control channels each including a command unit 22 coupled in its turn to a different stepper 25. The stepper in the first control channel is coupled to an output shaft 70, to the end of which is affixed a gear 71, which meshes with another gear 72 affixed to one input shaft 73 of a first differential unit 74. The stepper 25 in the second channel is coupled through a gear reducer 76, which may have a reduction ratio of 1:1,000, the output side of which is coupled to a second input shaft 77 of first differential unit 74. Output shaft 78 of differential unit 74 is affixed by a coupler 80 to a first input shaft 81 of a second differential unit 82. The stepper 25 of the third control channel is coupled over its output shaft 83 to another gear reducer 84, which in the illustrated embodiment has a reduction ratio of 1:1000,000. The output side of gear reducer 84 is coupled to a second input shaft 85 of second differential unit 82. The output shaft 86 of differential unit 82 is coupled to the input side of a gear train 32, which in its turn is coupled through a high-frequency pulse producer 34 and a stepper 25 to driven member 27. It will be apparent to those skilled in the art that driven member 27 can be coupled directly to output shaft 86 of second differential unit 82; the units interposed therebetween are for amplification purposes only.

The operation of the system of FIGURE 4 is related to that of the system shown in FIGURE 3. Specifically, when it is desired to effect a system operation and position driven member 27 to an accuracy of eight significant figures, control knob 23 of command unit 22 in the first control channel is adjusted to preset the first three significant figures, a similar adjustment is made on command unit 22 in the second control channel to determine the next three significant figures, and the control knob of command unit 22 in the third control channel is adjusted in accordance with the desired last two significant figures of the rotational setting. In this way an incremental rotation of reference member 17 effects the translation of electrical pulse signals to the input sides of each of the three control channels, and these signals are variously divided in the respective command units and gear reducers to provide shaft rotation signals accumulated in differentials 74 and 82 to provide a final rotational position of driven member 27 accurate to eight significant figures. It is then possible to rapidly reset each control channel to zero preparatory to the next cycle of operation; manifestly such reset is substantially more rapid than is possible with a single channel in which all eight significant figures are tallied.

Use of the inventive combination provides an electro-mechanical transmission in which the rotation of a driven member is related to the rotation of a reference member with a degree of precision not possible with heretofore known mechanical translation systems. Translation of the mechanical rotation into signals in the time or frequency domain and use of electrical measuring equipment to operate upon such signals contribute to the greatly enhanced accuracy of the inventive system. The stepping-up of the angular displacement of the reference member to provide many more signal pulses than would be obtained without such step-up, and the counting of the increased number of signal pulses to produce a single step motion of the driven member, permits an extremely precise adjustment of the positive displacement ratio between reference and driven members. Moreover, by manipulating the controls of command unit 22 to vary the preset count, an electronic gear-shift is in effect provided. The positive displacement ratio between the movements of driven member 27 and reference member 17 may be varied by alteration of the preset count even while the system is in operation. Such precise control of the displacement ratio, and the effect of an electronic gear-shift, has not been possible with any mechanism heretofore utilized in this art.

Although particular embodiments of the invention have been shown and described, it is apparent that modifications and alterations may be made, and it is intended in the appended claims to cover all such modifications and alterations as may fall within the true spirit and scope of the invention.

I claim:

1. An electro-mechanical transmission comprising a reference member subject to changing speeds of rotation during operation, pulse-producing means coupled to said reference member for producing an electrical signal pulse for each given increment of rotation of said reference member, a command unit coupled to said pulse-producing means operative to issue a single command pulse responsive to receipt of a preset number of said electrical signal pulses, the spacing between successive single pulses provided by said command unit for any preset number being uniform for a constant speed of said reference member, and variable in direct proportion to changes in said speed, a driven member, pulse responsive means which step through a predetermined angular increment for each single pulse, and means connected to said pulse responsive means to rotate said driven member through a related predetermined increment for each operation of said pulse responsive means.

2. An electro-mechanical transmission comprising a rotatable reference member subject to variable speeds of rotation during operation, means coupled to said reference member for producing a preset plurality of electrical signal pulses for each given increment of angular rotation of said reference member, a pulse counter unit coupled to said pulse-producing means preset to produce a digital output comprising only a single pulse responsive to receipt of a preset plurality of said electrical signal pulses, the spacing between successive single pulses provided by said pulse counter unit for any preset number being uniform for a constant speed of said reference member, and variable in direct proportion to changes in said speed, a driven member, and stepping means comprising a pulse responsive means which steps through a predetermined increment of rotation responsive to receipt of each single pulse, and means for rotating said driven member a corresponding increment for each single pulse received by said pulse responsive means.

3. An electro-mechanical transmission comprising a rotatable reference member which is subject to variable speeds of rotation during operation, pulse-producing means coupled to said reference member to produce a preassigned number of electrical signal pulses for each given increment of rotation of said reference member, a digital counter unit coupled to said pulse-producing means operative to issue only a single pulse responsive to receipt of a preset number of electrical signal pulses, including selector means adjustable to different positions to preset a correspondingly different number for said counter unit, the spacing between successive single pulses provided by said counter unit for any preset number being uniform for a constant speed of said reference member, and variable in direct proportion to changes in said speed, a driven member, and stepping means including pulse responsive means operative through a predetermined increment of rotation responsive to receipt of each single pulse, and means connected to said pulse responsive means for rotating said driven member through a corresponding increment.

4. An electro-mechanical transmission comprising a rotatable reference member which is subject to changing speeds during operation, drive ratio modifying means coupled to said reference member operative in response to a give increment of rotation of said reference member to provide a different predetermined rotational output, pulse-producing means coupled to said drive ratio modifying means for providing a preassigned number of electrical signal pulses for each predetermined rotational output of said drive ratio modifying means, means including a pulse counter unit coupled to said pulse-producing means preset to issue only a single command pulse responsive to receipt of a predetermined number of said electrical signal pulses, the spacing between successive single pulses provided by said pulse counter unit for any preset number being uniform for a constant speed of said reference member, and variable in direct proportion to changes in said speed, a driven member, and stepping means including a pulse responsive motor means which steps through a predetermined increment of rotation responsive to receipt of each single pulse, and means connected to said pulse responsive motor for stepping said driven member a corresponding increment for each angular displacement of said motor.

5. An electro-mechanical transmission comprising a rotatable reference member which is subject to changing speeds during operation, pulse-producing means including a pulse generator coupled to said reference member for providing a preset plurality of electrical signal pulses for each increment of rotation of said reference member, means including digital counter means coupled to said pulse-producing means preset to count a predetermined number of received electrical signal pulses and to issue only a single pulse responsive to receipt of said predetermined number of said electrical signal pulses, the spacing between successive single pulses provided by said decade counter means for any predetermined number being uniform for a constant speed of said reference member, and variable in direct proportion to changes in said speed, a driven member, and stepping means including a pulse responsive motor means which operates through predetermined increment of rotation responsive to receipt of each single pulse, and means connected to said pulse responsive motor to rotate said driven member a corresponding increment for each angular displacement thereof.

6. An electro-mechanical transmission comprising a rotatable reference member which is subject to changing angular velocities, drive ratio modifying means coupled to said reference member operative in response to a given increment of rotation of said reference member to provide a different predetermined rotational output, pulse-producing means coupled to said drive ratio modifying means for providing a preassigned number of electrical signal pulses for each predetermined rotational output of said drive ratio modifying means, command means including a counter means for providing a digital output coupled to said pulse-producing means, said counter means having means preset to count a predetermined number of received electrical signal pulses, control means for issuing only a single digital pulse responsive to receipt of said predetermined number of electrical signal pulses, the spacing between successive single pulses provided by said counter means for any preset number being uniform for a constant speed of said reference member, and variable in direct proportion to changes in said speed, and selector means adjustable to different positions to preset said control means to provide a digital pulse responsive to a correspondingly different number of said electrical signal pulses, a driven member, and pulse responsive means coupled between said command means and said driven member for stepping said driven member through a preassigned increment of rotation responsive to receipt of each digital pulse.

7. An electro-mechanical transmission for effecting rotation of a driven member in relation to rotation of a reference member comprising: a gear train coupled to said reference member operative in response to a given increment of rotation of said reference member to provide a predetermined rotational output substantially greater than said given increment of rotation; a magnetic tachometer transducer coupled to said gear train for providing a preassigned plurality of electrical signal pulses for each predetermined rotational output of said gear train; a preset pulse counter coupled to said magnetic tachometer transducer including circuit means for counting a number of received electrical signal pulses, control means for issuing only a single command pulse responsive to receipt of a predetermined number of said electrical signal pulses, including selector means adjustable to different positions to regulate said control means to provide a command pulse responsive to correspondingly different numbers of said electrical signal pulses; the spacing between successive single pulses provided by said control means for any predetermined number being uniform for a constant speed of said reference member, and variable in direct proportion to changes in said speed, and stepping means including a multi-winding motor coupled between said preset counter and said driven member for effecting a preassigned angular displacement of said driven member responsive to receipt of a single command pulse.

8. A dual control channel system for effecting rotation of a driven member in relation to rotation of a reference member comprising: a fine rotational control channel including an electro-mechanical transmission comprising pulse-producing means coupled to said reference member for providing a preassigned number of electrical signal pulses for each given increment of rotation of said reference member, a command unit coupled to said pulse-producing means having circuit means for counting a number of received electrical signal pulses and for issuing only a single command pulse responsive to receipt of a predetermined number of said electrical signal pulses, the spacing between successive single pulses provided by said circuit means for any predetermined number being uniform for a constant speed of said reference member, and variable in direct proportion to changes in said speed, and stepping means coupled between said command unit and said driven member for effecting a preassigned angular displacement of said driven member responsive to receipt of a single command pulse; and an approximate rotational control channel including a gear train parallel-coupled with said electro-mechanical transmission between said reference member and said driven member, whereby the ultimate rotational position of said driven member is determined by signals translated over each of said control channels.

9. A dual control channel system for effecting rotation of a driven member in relation to rotation of a reference member comprising: a differential unit having an output shaft coupled to said driven member and a pair of input shafts; a fine rotational control channel comprising an electro-mechanical transmission including pulse-producing means coupled to said reference member for providing a preassigned number of electrical signal pulses for each given increment of rotation of said reference member, a command unit coupled to said pulse-producing means having circuit means for counting a number of received electrical signal pulses and for issuing only a single command pulse responsive to receipt of a predetermined number of said electrical signal pulses, the spacing between successive pulses provided by said circuit means for any predetermined number being uniform for a constant speed of said reference member, and variable in direct proportion to changes in said speed, and stepping means coupled between said command unit and one of said differential input shafts for effecting a preassigned increment of rotation of said one input shaft responsive to receipt of a single command pulse; and an approximate rotational control channel including a gear train coupled between said reference member and the other of said differential input shafts, whereby the ultimate rotational position of said driven member is determined by signals translated over each of said control channels.

10. A control system including a plurality of control channels for effecting rotation of a driven member in relation to rotation of a reference member comprising: pulse-producing means coupled to said reference member for providing a preassigned number of electrical signal pulses for each given increment of rotation of said reference member; a differential unit having an output shaft coupled to said driven member and a pair of input shafts; a first control channel including a command unit coupled to said pulse-producing means for providing a single pulse responsive to receipt of a preassigned number of said electrical signal pulses, the spacing between successive single pulses provided by said command unit for any predetermined number of said single pulses being uniform with said reference member operating at a constant speed, and variable in direct proportion to changes in said speed, and stepping means coupled to said command unit for providing preassigned angular displacement of said one input shaft for each of said uniformly spaced single pulses provided to said stepping means by said command unit; and a second control channel coupled between said pulse-producing means and the other of said differential input shafts for effecting a predetermined angular displacement of said other input shaft responsive to receipt of a preassigned number of said electrical signal pulses, whereby the ultimate rotational position of said driven member is determined by signals translated over each of said control channels.

11. A control system including a plurality of control channels for effecting rotation of a driven member in relation to rotation of a reference member comprising: pulse-producing means coupled to said reference member for providing a preassigned number of electrical signal pulses for each given increment of rotation of said reference member; a differential unit having an output shaft coupled to said driven member and a pair of input shafts; a first control channel including a command unit and a stepping means series-coupled between said pulse-producing means and one of said differential input shafts for providing a single step of said stepping means and thereby a preassigned angular displacement of said one input shaft responsive to receipt of a preassigned number of said electrical signal pulses, the spacing between successive steps of said stepping means for any preassigned number being uniform for a constant speed of said reference member, and variable in direct proportion to changes in said speed; and a second control channel including a second command unit, a second stepping means and a drive ratio modifying means series-coupled between said pulse-producing means and the other of said differential input shafts for effecting a predetermined angular displacement of said other input shaft responsive to receipt of a preassigned number of said electrical signal pulses, whereby the ultimate rotational position of said driven member is determined by signals translated over each of said control channels.

12. A control system including a plurality of control channels for effecting rotation of a driven member in relation to rotation of a reference member comprising: pulse-producing means coupled to said reference member for providing a preassigned number of electrical signal pulses for each given increment of rotation of said reference member; a first differential unit having an output shaft and a pair of input shafts; a first control channel including a command unit for providing a single output pulse responsive to receipt of said preassigned number of signal pulses, the spacing between successive single pulses provided by said command unit for any predetermined number being uniform for a constant speed of said reference member, and variable in direct proportion to changes in said speed, and a stepping means series-coupled between said comand unit and one of first differential input shafts for effecting a preassigned angular displacement of said one input shaft responsive to receipt of each said signal pulse; a second control channel including a second command unit for providing a single output pulse responsive to receipt of a second preassigned number of said signal pulses, the spacing between successive single pulses provided by said second command unit for any predetermined number being uniform for a constant speed of said reference member, and variable in direct proportion to changes in said speed, a second stepping means and a drive ratio modifying means series-coupled between said second command unit and the other of said first differential input shafts for effecting a predetermined angular displacement of said other input shaft responsive to receipt of said second preassigned number of said electrical signal pulses; a second differential unit having an output shaft coupled to said driven member and a pair of input shafts; means for coupling one of said second differential input shafts to said first differential output shaft; and a third control channel including a third command unit for providing a single output pulse responsive to receipt of a third preassigned number of said signal pulses, the spacing between successive single pulses provided by said third command unit for any predetermined number being uniform for a constant speed of said reference member, and variable in direct proportion to changes in said speed, a third stepping means and a second drive ratio modifying means series-coupled between said third command unit and the other of said second differential input shafts, whereby the ultimate rotational position of said driven member is determined by signals translated over each of said control channels.

References Cited by the Examiner

UNITED STATES PATENTS

| | | | |
|---|---|---|---|
| 2,523,503 | 9/1950 | Fairbanks | 318—8 |
| 2,943,251 | 6/1960 | Hull | 318—162 |
| 2,945,997 | 7/1960 | Kennedy | 310—49 X |
| 3,015,806 | 1/1962 | Wang et al. | 318—162 X |
| 3,036,223 | 5/1962 | Phillips. | |
| 3,064,173 | 11/1962 | Breen et al. | 318—85 X |
| 3,184,663 | 5/1965 | Mergler | 318—85 X |

MILTON O. HIRSHFIELD, *Primary Examiner.*

JOHN F. COUCH, *Examiner.*

T. LYNCH, *Assistant Examiner.*